(12) United States Patent
Nakajima et al.

(10) Patent No.: US 6,409,606 B1
(45) Date of Patent: Jun. 25, 2002

(54) POWER TRANSMISSION SHAFT (75) Inventors: Tatsuo Nakajima, Iwata; Hitoshi Kodama; Tsuneo Takano, both of Toyohashi, all of (JP)

(73) Assignees: NTN Corporation, Osaka; Mitsubishi Rayon Kabushiki Kaisha, Tokyo, both of (JP)

( * ) Notice: Subject to any disclaimer, the term of this patent is extended or adjusted under 35 U.S.C. 154(b) by 0 days.

(21) Appl. No.: 09/627,157

(22) Filed: Jul. 27, 2000

(30) Foreign Application Priority Data

Aug. 5, 1999 (JP) .............................. 11-222982

(51) Int. Cl.[7] .............................. F16L 9/14; F16C 3/00
(52) U.S. Cl. ..................... 464/181; 464/183; 464/902; 138/114; 138/143
(58) Field of Search .................. 464/179, 180, 464/181, 183, 902; 138/114, 143, 157

(56) References Cited

U.S. PATENT DOCUMENTS

| | | | | |
|---|---|---|---|---|
| 2,751,765 A | * | 6/1956 | Rowland et al. ............ | 464/180 |
| 4,014,184 A | * | 3/1977 | Stark .......................... | 464/180 |
| 4,649,960 A | * | 3/1987 | Policelli ..................... | 138/109 |
| 4,909,361 A | * | 3/1990 | Stark et al. ................. | 464/180 |
| 5,566,721 A | * | 10/1996 | Breese ........................ | 138/145 |
| 5,685,344 A | * | 11/1997 | Iorio et al. .................. | 138/140 |
| 5,762,109 A | * | 6/1998 | Matthews et al. .......... | 138/149 |
| 5,868,627 A | * | 2/1999 | Stark et al. ................. | 464/180 |
| 5,924,531 A | * | 7/1999 | Stark et al. ................. | 464/180 |
| 5,976,021 A | * | 11/1999 | Stark et al. ................. | 464/180 |
| 6,241,062 B1 | * | 6/2001 | Enright ....................... | 188/378 |
| 6,279,221 B1 | * | 8/2001 | Glowacki et al. ......... | 403/359.6 |

* cited by examiner

*Primary Examiner*—Lynne H. Browne
*Assistant Examiner*—Kenn Thompson
(74) *Attorney, Agent, or Firm*—Arent Fox Kintner Plotkin & Kahn, PLLC (57) ABSTRACT

A power transmission shaft to be used mainly in vehicles comprises metal joint elements and a metal pipe connected to each other. A fiber reinforced plastic pipe having a large flexural modulus of elasticity is inserted into the metal pipe, thus forming a composite FRP shaft having flexural rigidity sufficient to serve as a power transmission shaft.

17 Claims, 9 Drawing Sheets

POWER TRANSMISSION SHAFT

BACKGROUND OF THE INVENTION

1. Field of the invention

The present invention relates to power transmission shafts. More particularly, it relates to those that can be used such as for propeller shafts and drive shafts, which constitute a power transmission system of vehicles.

2. Related Art

Shafts constituting the power transmission system of a vehicle include a propeller shaft for transmitting power from the gearbox to the reduction gear unit and a drive shaft for connecting the engine and the hub joint. The shafts, which are provided at the ends thereof with universal joints, are adapted to respond to a change in length and angle due to a variation in relative position between the gearbox and the reduction gear unit or between the engine and the hub joint.

Figure 9:
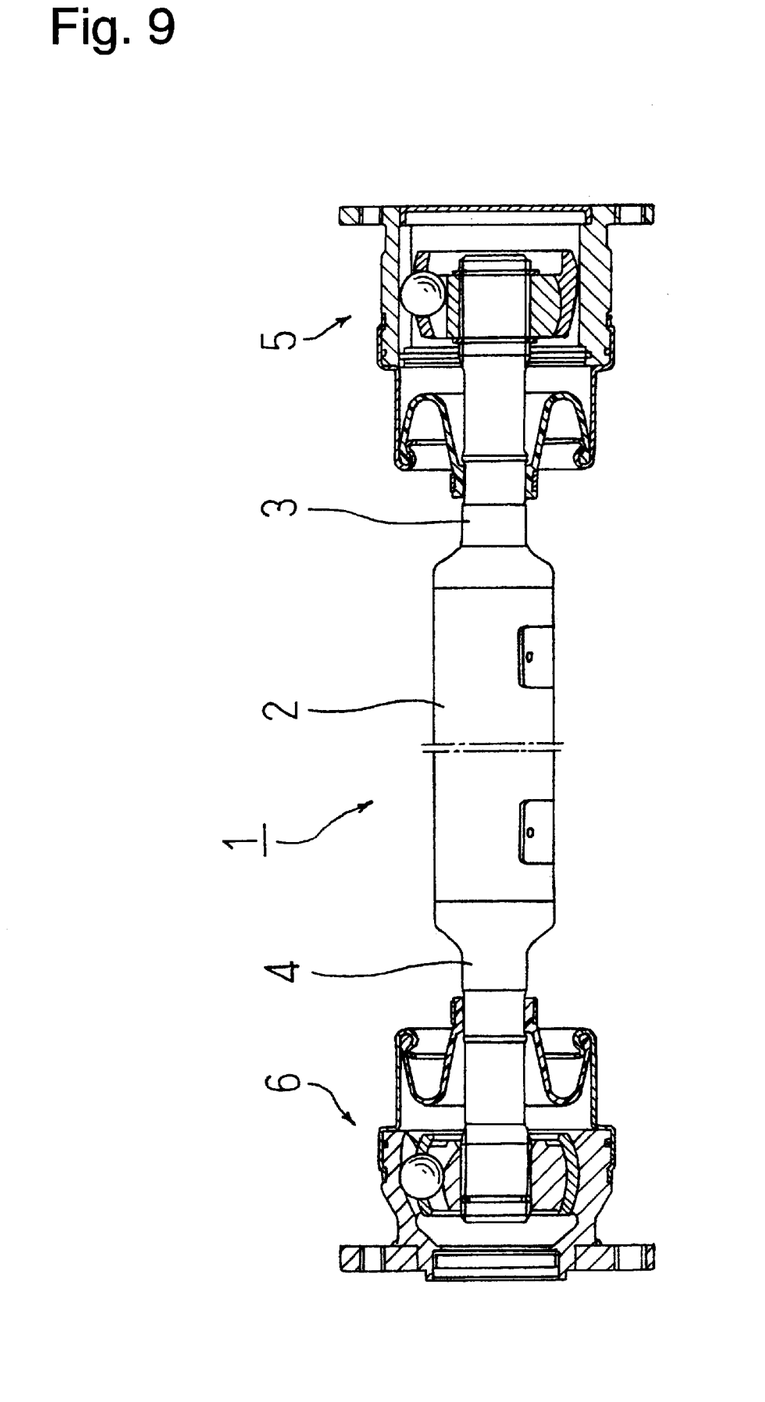
FIG. 9 is an external view of a propeller shaft.
Figure 10A:
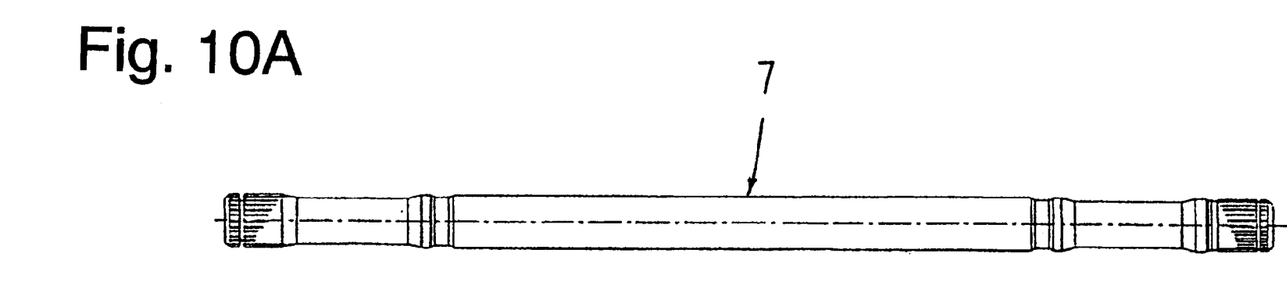
FIGS. 10A and 10B are views each showing an intermediate shaft of a drive shaft.
Figure 10B:
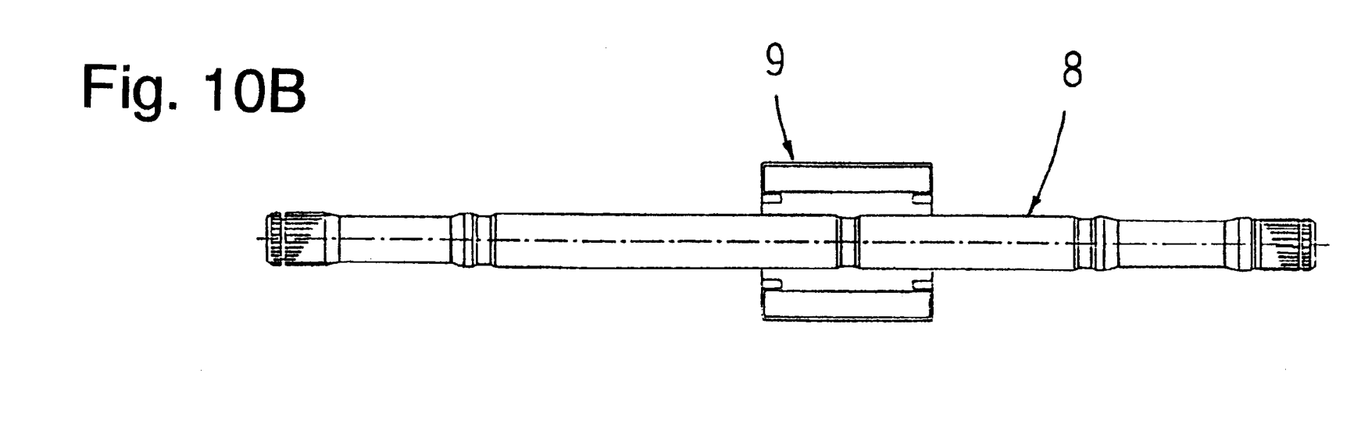

FIG. 9 is an overall external view of a prior-art propeller shaft 1. Metal joint elements or stub shafts 3, 4 are connected to the both ends of an intermediate shaft 2. The stub shafts 3, 4 mate with the inner joint members of constant velocity joints 5, 6 via splines or serrations. FIGS. 10A and 10B are views of an intermediate shaft of a drive shaft. FIG. 10A illustrates an intermediate shaft 7 with no dynamic damper, while FIG. 10B illustrates an intermediate shaft 8 with a dynamic damper 9 for preventing vibrations. In the prior art, hollow or solid steel shafts have been generally used for the intermediate shaft 2 of the propeller shaft 1 and the intermediate shafts 7, 8 of the drive shaft.

At present, from the viewpoint of flexural rigidity, long power transmission shafts made of steel need to be divided and provided with a bearing for supporting the intermediate portion thereof or with a dynamic damper at the intermediate portion thereof. Thus, the shafts are currently in need of some improvements in weight, cost, and the like.

For example, such an example has been suggested as employs a pipe formed of a fiber reinforced plastic (hereinafter referred to as "FRP") having a high specific strength. However, the joint portions thereof cannot be formed of FRP in one piece in terms of rigidity and strength and thus metal joints are connected to the end portions of the FRP. To connect the joints, the sleeve of the metal joint is press-fitted into or adhered to the end portions of the FRP pipe. On the other hand, Japanese Patent Laid-Open Publication No. Sho 55-118831 describes a method in which metal joints are inserted into an FRP pipe and thereafter the pipe is wound in conjunction with the joints by continuous fibers that are impregnated with resin. Alternatively, Japanese Patent Laid-Open Publication No. Sho 63-199914 suggests a method in which the fitted portions of the metal joints are formed in a non-circular shape and then the end portions of the shaft are heated to a temperature over the glass transition temperature thereof, and then the end portions are crimped onto the fitted portions of the joints. Other connecting methods were also employed in order to ensure the strength of joint portions and thus realize the transmission of torque. According to those methods, the cross section of the shaft end portions was formed in the shape of a polygon or the joint surfaces with which the shaft end portions of a hollow shaft overlap were formed to be coarse by knurling or the like. Alternatively, a hollow shaft made of FRP was crimped and metal parts were press-fitted into the center portion of the hollow shaft to be connected to joints. In addition, various methods were devised to maintain the strength of joint portions in the case of connection with adhesive interposed in between the contact surfaces of the end portions of a hollow shaft made of FRP and metal parts. Those methods include a combination of adhesive and making the surfaces coarse, crimping, or press-fitting.

However, these methods presented such problems that the shaft end portions were worked with difficulty or the outer diameter of the shaft had to be made larger to ensure the strength of the joints. Moreover, additional means had to be provided for preventing the joints from dropping off from the shaft in the axial direction in order to ensure reliability. In addition, the method for crimping a hollow shaft made of FRP had a serious disadvantage of lacking long-term reliability. The method may cause slipping to occur along the circumference or the shaft to slip off in the axial direction due to a decrease in binding force when the shaft is press-fitted, the decrease being caused by creep or a stress relaxation of the FRP portion. Furthermore, particularly in the case of drive shaft, many shafts could not provide torque transmission capacity enough to satisfy the product requirements due to an excessive torque. Furthermore, another problem was present in using a hollow shaft made of FRP as the intermediate shaft of a power transmission shaft to provide a reduction in weight, in fuel consumption, in cost, and in vibration and noise. That is, the shaft could not be made larger in diameter because enough space near the mounting portion of the shaft was not available within a vehicle.

SUMMARY OF THE INVENTION

In view of the foregoing problems, an object of the present invention is to provide a power transmission shaft with highly reliable joints, with high rigidity (a high natural bending frequency), light in weight, and low in cost in order to respond to the aforementioned demands for improvement.

The aforementioned problems by inserting an FRP pipe is inserted into a metal pipe in a power transmission shaft comprising metal joint elements and the metal pipe connected to each other. High rigidity can be provided for the shaft and the shaft can be made longer at the same time by interposing the hollow pipe made of FRP with high flexural rigidity inside the metal pipe. Moreover, providing improved rigidity for the shaft obviates the need for a support bearing or a dynamic damper at the intermediate portion, which were conventionally required for a long shaft, thus realizing a reduction in weight and cost. Furthermore, from a material viewpoint, it is a matter of course to be able to reduce the shaft in weight by concurrently using the metal pipe and the FRP pipe.

In addition, since the FRP pipe is inserted into the metal pipe to form a composite shaft, the metal portions form the joints on the end portions of the shaft. This allows the shaft to have strength sufficient to endure even large shearing and thus can transmit force with reliability. That is, reliable and perfect joint methods can be employed such as welding or friction welding of metal joint elements to a metal pipe. Consequently, no such deficiency occurs as sliding along the circumference of the pipe or slipping-off in the axial direction and thus the joint portions can be provided with long-term reliability.

Furthermore, FRP layers to be inserted into the metal pipe, having the fiber alignment angles of 0 and +/−45 degrees with respect to the axial direction of the metal pipe, can be stacked alternately. This is preferable in that flexural rigidity and torsional rigidity can be controlled. Alternatively, the flexural and torsional rigidity and buckling resistance may be controlled by the length of the FRP pipe to be inserted into the metal pipe, the wall thickness ratio between the metal pipe and the FRP pipe, the modulus of elasticity of the reinforcing fibers used, or the like.

It is preferable to employ a material with low density and large modulus of elasticity as the fibers constituting the FRP pipe in order to provide a high natural bending frequency for the composite shaft. Such fibers include PAN-based and pitch-based carbon fibers, silicon carbide fibers, alumina fibers, boron fibers, glass fibers, para-aramid fibers (for example, Kevlar, trademark of Du Pont), and metal fibers (steel, aluminum alloy, titanium alloy, copper, and tungsten fibers).

The tensile modulus of reinforcing fibers used is preferably not less than 20000 kgf/mm$^2$ (196 GPa) and more desirably not less than 25000 kgf/mm$^2$ (245 GPa). If the tensile mudulus of the reinforcing fibers is below 20000 kgf/mm$^2$ (196 GPa), it is impossible to provide a high natural bending frequency for the shaft at any fiber alignment angle of the FRP.

PAN-based carbon fibers can be preferably used with the diameter of the fiber being not less than 1 μm and not greater than 20 μm, and more desirably not less than 5 μm and not greater than 8 μm. The fiber less than 1 μm in diameter requires more cost to obtain raw materials or acrylic fibers and makes it more difficult to control the baking and processing of the fibers into carbon fibers. This causes an increase in the price of the fibers and thus makes it impossible to provide shafts at low cost. Moreover, the fiber 20 μm or more in diameter makes it impossible to provide fibers with high modulus of elasticity.

In the case of using pitch-based carbon fibers, mesophase pitch-based carbon fibers, long and having large modulus of elasticity, may be preferably employed.

It is also possible to combine two or more fibers of different types to provide the shaft at much lower cost. In particular, fibers with a larger specific modulus of elasticity can provide more effect on a reduction in weight and thus can be preferably used in power transmission shafts. That is, PAN-based carbon fibers are preferable in terms of specific strength and mesophase pitch-based carbon fibers are preferable in terms of specific modulus of elasticity. However, it is also possible to employ the hybridization of these carbon fibers, or these carbon fibers and glass fibers from a viewpoint of reduction in cost.

These fibers are drawn to be thin-walled and large in diameter. That is, it is possible to manufacture efficiently a body having a uniform cross section like a pipe by impregnating these fibers with a precured matrix resin and then by continuously curing the plurality of the tows while being over-wound. The FRP pipe can be formed in advance by means of the sheet wrapping method. However, in some cases, the pultrusion method may provide a cost advantage of significantly reducing loss of materials at the time of manufacturing. An FRP pipe having a configuration with stacked layers can be formed by over-winding, however, the number of layers is preferably 20 or less. This is because trying to obtain a body formed with 20 stacked layers or more would make the preparatory work very complicated and thus impair the mass productivity.

It is also possible to form a composite shaft by press-fitting a formed FRP pipe into a metal pipe (see FIGS. 2A–5D and 8A–8D). In addition, the FRP pipe may be provided with a slit (gap or rip) 21 or 22 on a part of the circumference (see FIGS. 3A–5D, 7A and 7B) or may be formed by drawing into the shape of an uneven cross section with shallow grooves constituting adhesive pools.

Figure 3A:
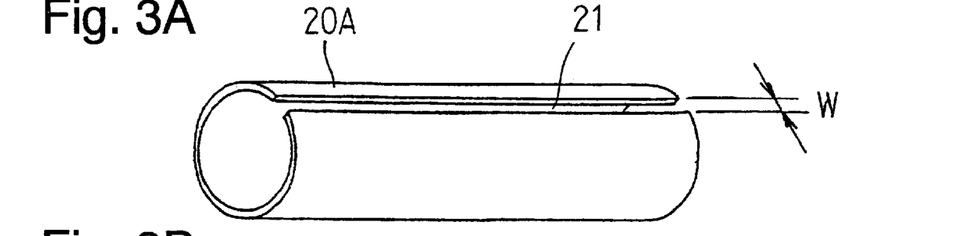
FIG. 3A is a perspective view showing an FRP pipe provided with a slit.
Figure 3B:
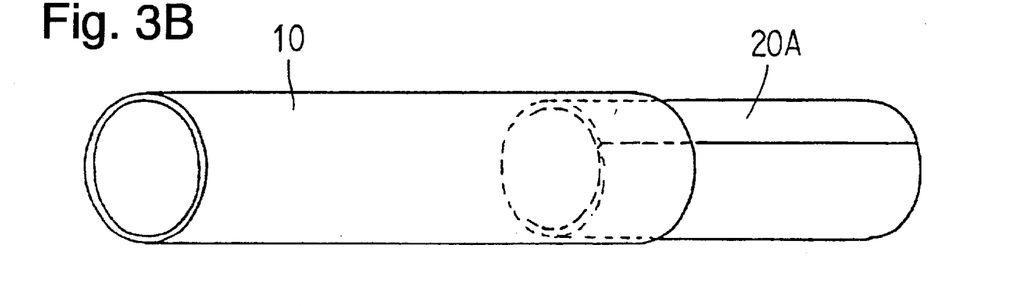
FIG. 3B is a perspective view showing a step in which an FRP pipe is press-fitted into a metal pipe.
Figure 3C:
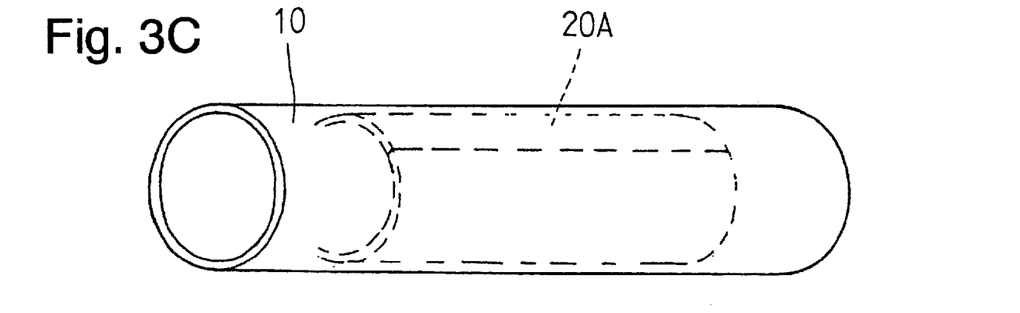
FIG. 3C is a perspective view showing a metal pipe in which an FRP pipe has been press-fitted.
Figures 3D, 3E:
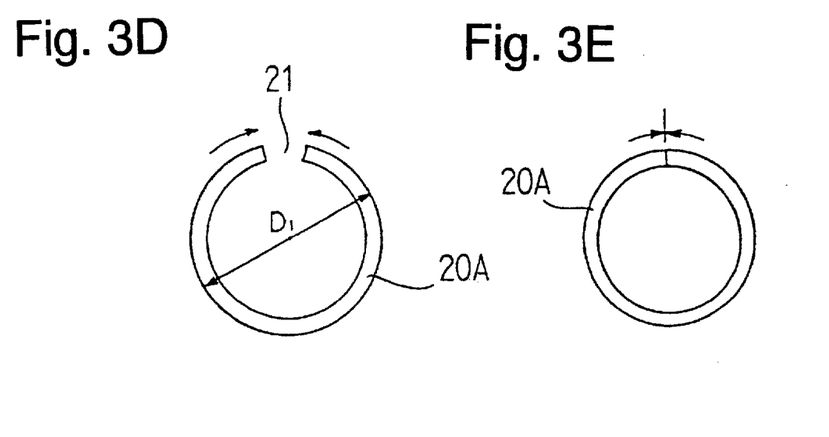
FIG. 3D is an end view of an FRP pipe with a slit in a natural state.
FIG. 3E is an end view of an FRP pipe with a slit with the diameter thereof in a contracted state.

When an FRP pipe 20A with which the slit 21 is provided in the axial direction is incorporated into a metal pipe 10 as shown in FIG. 3A–3E, elastic deformation is readily allowed within the range of width W of the slit along the circumference (see FIGS. 3D and 3E. This makes it significantly easier to incorporate the FRP pipe 20A into the metal pipe 10, compared with the case where a simple FRP pipe with no slit is press-fitted into the metal pipe. That is, due to dimensional tolerances given to the outer diameter of the FRP pipe and the inner diameter of the metal pipe, it is necessary to match the respective dimensions with each other to control the press-fit pressure in the process when a simple cylindrical pipe is used. In contrast, the FRP pipe 20A with the slit 21 can be incorporated into the metal pipe 10 without such a process as to match the respective dimensions with each other and with only a low press-fit pressure.

The slit width W is preferably set not less than 0.01% and not greater than 40% in width of the outer circumference of the FRP pipe in a natural state. In some cases, if the slit width W were less than 0.01% of the FRP pipe, it would be necessary to match the respective dimensions with each other even when the FRP pipe was elastically deformed along the circumference. On the contrary, if the slit width W were greater than 40% of the outer circumference of the FRP pipe, such a problem would occur in some cases that the FRP pipe would swing due to a loss of balance at the time of rotating at high speeds. No restrictions are imposed on the cross-sectional shape of the slit. As a matter of course, it is more preferable that the slit can be formed continuously at the time of drawing. Moreover, the FRP pipe may be first formed in advance and then provided with the slit by machining thereafter.

Figure 4A:
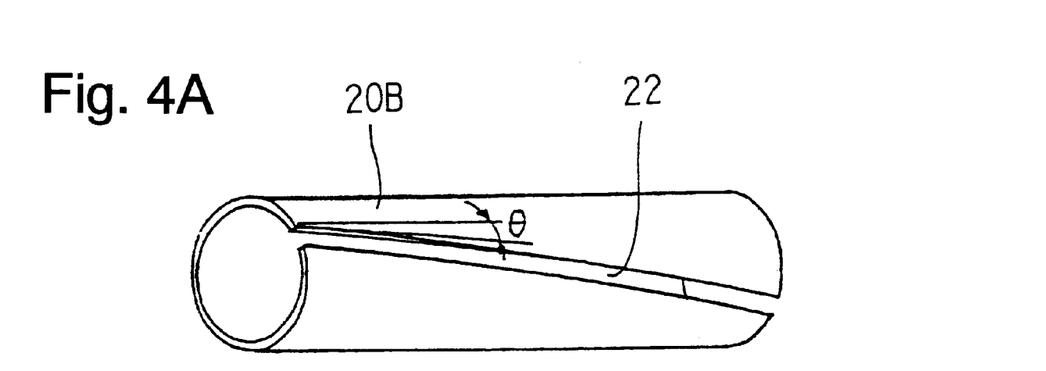
FIG. 4A is a perspective view showing an FRP pipe with a slit formed at a bias angle.
Figure 4B:
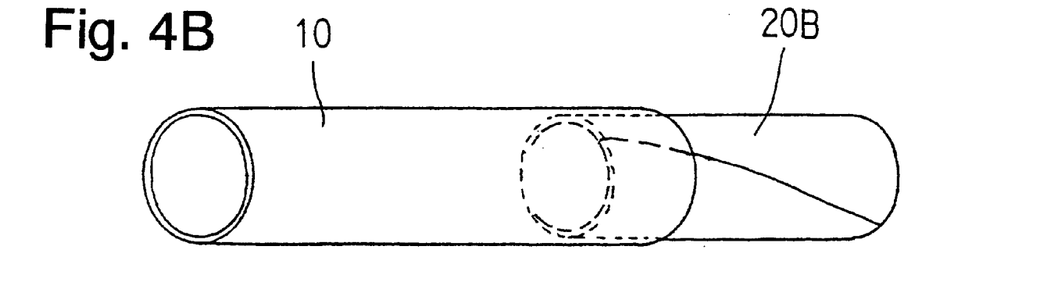
FIG. 4B is a perspective view showing a step in which an FRP pipe is inserted into a metal pipe.
Figure 4C:
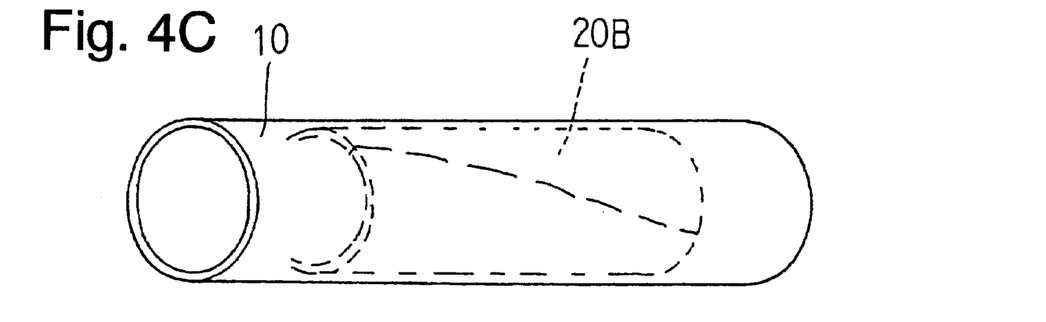
FIG. 4C is a perspective view showing a metal pipe in which an FRP pipe has been inserted.
Figure 5A:
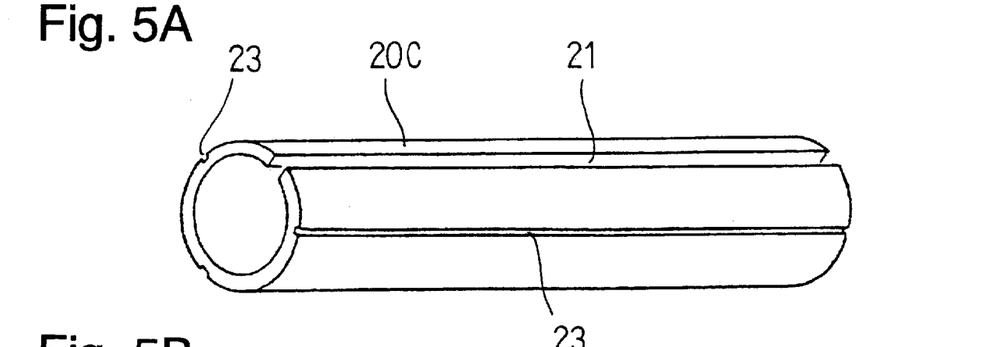
FIG. 5A is a perspective view showing an FRP pipe provided with axial grooves and a slit.
Figure 5B:
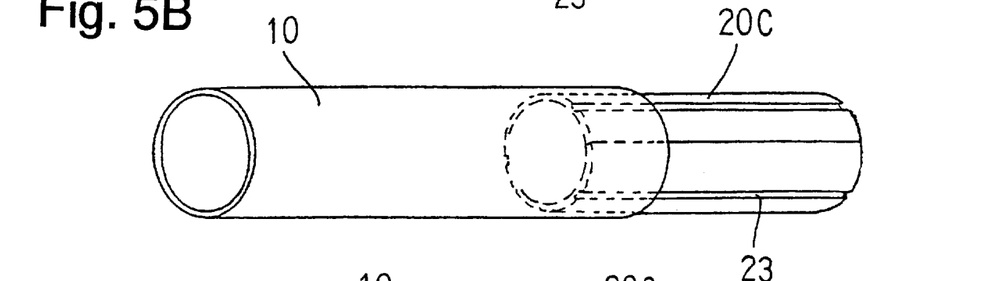
FIG. 5B is a perspective view showing a step in which an FRP pipe is inserted into a metal pipe.
Figure 5C:
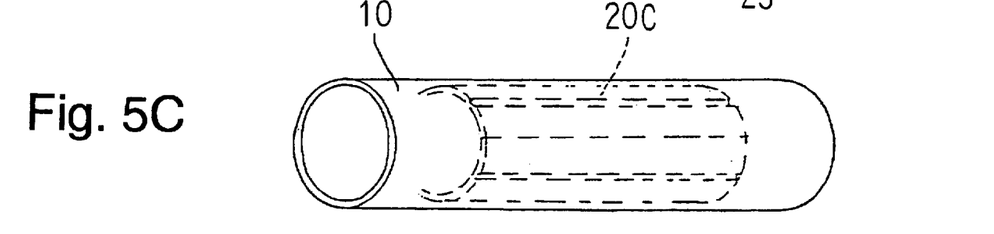
FIG. 5C is a perspective view showing a step in which an FRP pipe is inserted into a metal pipe.
Figure 5D:
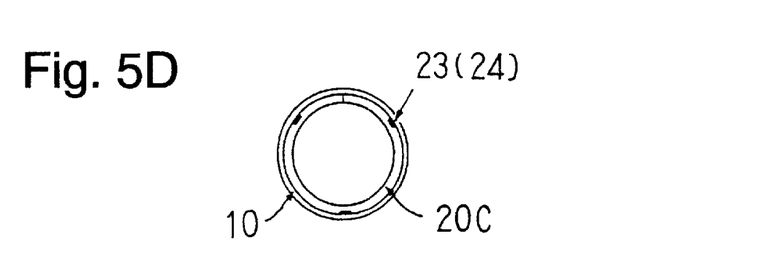
FIG. 5D is an end view of FIG. 5C.

When the slit is formed continuously at the time of drawing, the slit 22 can be provided on an FRP pipe 20B at a bias angle of θ with respect to the axial direction as shown in FIG. 4A–4C. In this case, the bias angle θ is be preferably within +/−30 degrees. The slit with a bias angle θ greater than 30 degrees would not contribute to the improvement in the flexural rigidity of the composite shaft, even when the shaft is incorporated with an FRP pipe employing reinforcing fibers with a large modulus of elasticity. This is because the tows would align in the direction of the slit.

The outer diameter of the FRP pipe with a slit may be formed larger than the inner diameter of the metal pipe so that the apparent outer diameter may be less than the inner diameter of the metal pipe when the FRP pipe is elastically deformed (contracted in diameter) along the circumference by the width of the slit. In this case, $D_1/D_2$ is desirably greater than 1 and not greater than 1.3, where $D_1$ (see FIG. 3D) is the outer diameter of the FRP pipe with the slit and $D_2$ (see FIG. 1A) is the inner diameter of the metal pipe. With a value of $D_1/D_2$ being equal to or less than 1, the outer diameter of the FRP pipe cannot be made greater than the inner diameter of the metal pipe, thus resulting in a gap therebetween. On the contrary, with a value of $D_1/D_2$ being greater than 1.3, the FRP pipe may be contracted beyond the elastic deformation region, thereby leading to a defective condition such as cracks or the like. After the FRP pipe has been incorporated into the metal pipe, the FRP pipe is to expand in the metal pipe back to the outer diameter provided when formed. This force serves to fix the FRP pipe inside the metal pipe by working as a pressing force on the boundary surfaces between the metal pipe and the FRP pipe. This fixing force will act more advantageously in drawing the metal pipe or the method in which adhesive is employed.

Figure 2A:
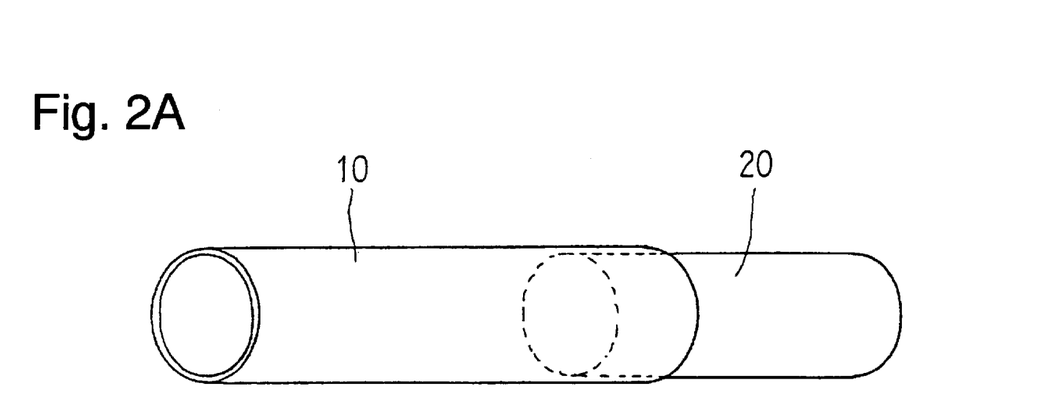
FIG. 2A is a perspective view showing a step in which an FRP pipe is press-fitted into a metal pipe.
Figure 2B:
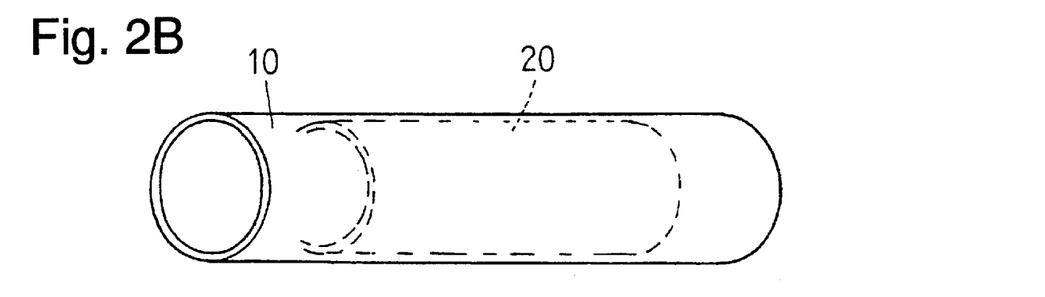
FIG. 2B is a perspective view showing a metal pipe in which an FRP pipe has been press-fitted.
Figure 2C:
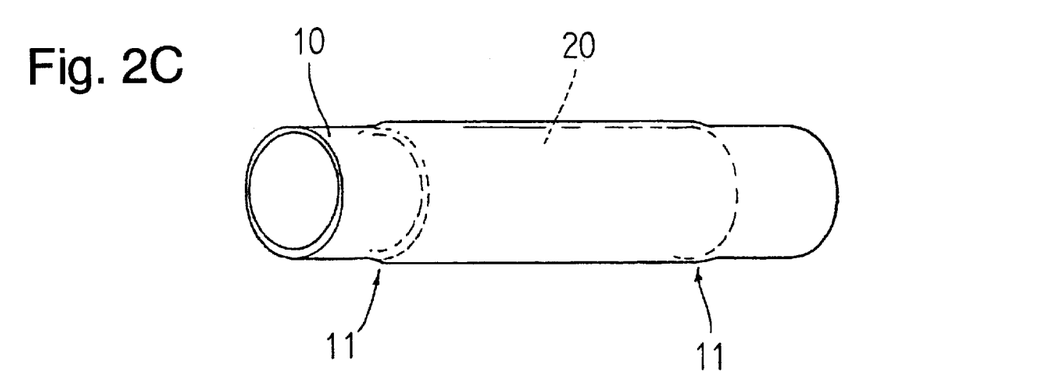
FIG. 2C is a perspective view showing a metal pipe both ends of which are drawn.

The FRP pipe may be incorporated into the metal pipe and thereafter the metal pipe may be plastically deformed, for example, by drawing to contract the diameter thereof and thereby fix the FRP pipe. In FIG. 2C, the corresponding contracted diameter portion is designated with reference numeral 11.

An adhesive may be used to fix the FRP pipe to the metal pipe. However, in some cases, press-fitting a simple cylindrical pipe into a similar one would cause the adhesive to be stripped away when the FRP pipe is press-fitted and thus no adhesive layer to be formed in the boundary region between the metal pipe and the FRP pipe. In order to solve this problem, the FRP pipe may be provided, on outer circumference portions thereof, with portions that form adhesive pools 24 (see FIG. 5D) in between the metal pipe and the FRP pipe after the incorporation of the FRP pipe. Specific forms of such portions include, for example, axial grooves 23 (see FIG. 5A–5D), circumferential grooves 25 (see FIG. 7A), and recessed portions 26 (see FIG. 7B). In addition, as set forth in claim 10, portions that form adhesive pools 13 after the incorporation of the FRP pipe may be provided plastically in advance on inner circumference portions of the metal pipe (FIG. 8).

In general, no restrictions are imposed on adhesives used so long as the adhesives allow metal to adhere to FRP. For example, the adhesives for allowing metal to adhere to FRP, which are described in the "SETTYAKU NO KAGAKU TO JISSAI" issued and published by Kabushiki Kaisha Kobunshi or in the "KOSEINOU WO UMU SETTYAKUZAI ERABI" published by Kabushiki Kaisha Gijutsu Hyoronsha, can be all used. However, a more desirable adhesive is a structural adhesive in which aluminum powder or iron oxide powder is contained in a solvent-type epoxy-based adhesive and which enables resistance welding typified by the spot welding. When the balance of shafts is corrected later in the process, balance pieces can be welded to the shafts with no problems if those adhesives that allow welding have been used in the shafts. To cure the adhesives, the heat available at the time of bake painting to which the outer circumference portion of the metal pipe is subjected can be used.

No particular restrictions are imposed on thermosetting resins to be used as the matrix of the FRP pipe. In general, such resins with a thermosetting property can be used as epoxy resin, phenol resin, unsaturated polyester resin, vinyl ester resin, urethane resin, alkyd resin, xylene resin, melamine resin, furan resin, silicon resin, polyimide resin, and the like. However, from a strength viewpoint, epoxy resin can be preferably used.

When epoxy resin is used for the matrix, the epoxy resin, after having been cured, may be preferably provided with heat resistance or a glass transition temperature not less than 60° C. or more desirably not less than 80° C. When the shaft is used as a power transmission shaft of vehicles, the atmospheric temperature rises up to about 60° C. Accordingly, the cured epoxy with a heat resistance less than 60° C. may cause a serious problem such as a damage to the shaft and thus such epoxy cannot be used as the matrix. It is also possible to use a reformed epoxy resin to which impact resistance is given by dispersing rubber particles in the epoxy resin to form an island configuration or a modified epoxy resin whose principal chains or side chains are modified chemical-structurally. In this case, a damping property can be given to the resulting power transmission shaft structure. In addition, it is also possible to use an epoxy resin that is given conductivity by dispersing conductive fillers such as carbon black or metal particles in the epoxy resin.

It is also possible to improve the strength of the boundary surface between the matrix and the fiber as follows. That is, the surface of the reinforcing fiber to be used can be activated by the oxidation treatment with ozone or by illuminating the surface with ultraviolet light. Alternatively, the wet processing with a silane coupling agent or a titanium coupling agent can be applied to improve the affinity. Moreover, highly reactive group sites can be formed on the surface of the fiber to provide sturdy adhesion by forming chemical bonds with the thermosetting matrix resin after the resin has been cured.

No particular restrictions are imposed on the type of metal of the metal pipe so long as the metal can go through machining such as drilling, welding, friction welding, or press fitting. Preferable metals include iron, aluminum, copper, titanium, tungsten, nickel, and the like. In addition, any alloy of these metals can be employed as well.

The dimensions of the composite shaft comprising a metal pipe and an FRP pipe is determined by the natural bending frequency that is required for a power transmission shaft. That is, trying to satisfy the natural bending frequency required by using only metal pipes would cause the shaft to become larger in diameter and heavier. In this case, for example, the wall thickness of the metal pipe can be so designed as to meet only the static torsional strength required. Then, an FRP pipe with a large modulus of elasticity can be inserted into the metal pipe to satisfy the natural bending frequency required for the outer circumference portion of the metal pipe. Accordingly, the outermost diameter can be made smaller and thus the shaft can be made lighter in weight.

The dimensions of the metal pipe may be preferably not less than 100 mm and not greater than 6000 mm in length, and more desirably not less than 200 mm and not greater than 6000 mm. A metal pipe less than 100 mm in length and with a diameter that satisfies the static torsional strength required would already provide sufficiently high rigidity and thus no FRP pipe needs to be inserted into the metal pipe. A metal pipe greater than 6000 mm in length could be incorporated into a vehicle with difficulty even when the vehicle is a heavy-duty truck.

Figure 1A:
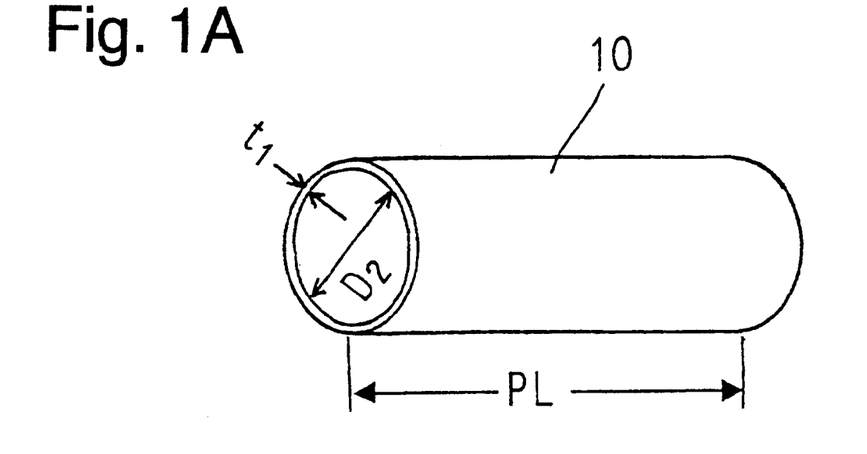
FIG. 1A is a perspective view showing a metal pipe.
Figure 1B:
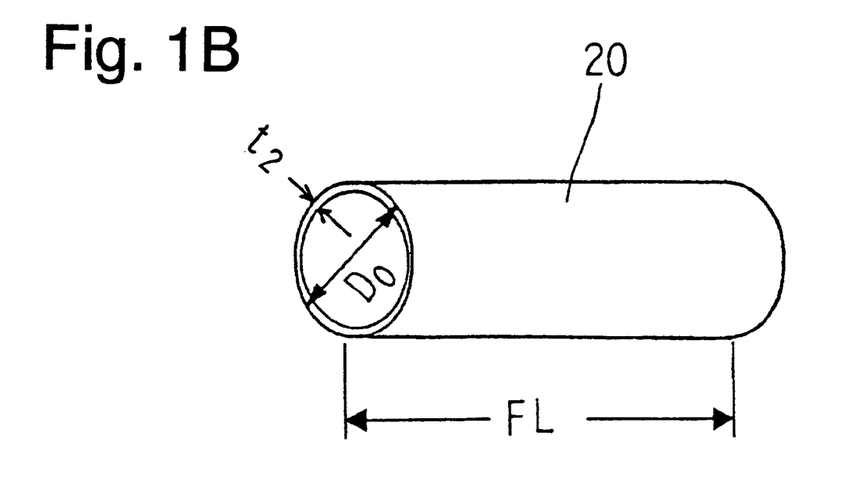
FIG. 1B is a perspective view showing an FRP pipe.

Furthermore, the axial length of the FRP pipe to be inserted into the metal pipe should preferably satisfy the condition that FL/PL is not less than 0.1 and not greater than 1.0, where PL is the length of the metal pipe (see FIG. 1A) and FL is the length of the FRP pipe (see FIG. 1B). With the value of FL/PL being less than 0.1, it is difficult to achieve the flexural rigidity required even if the shaft is incorporated with an FRP pipe having a large specific modulus of elasticity. Moreover, with the value of FL/PL being greater than 1.0, the FRP pipe becomes longer than the metal pipe. That is, the metal-to-metal joint method cannot be employed at least at one end of the resulting composite shaft and thus this cannot be admitted.

The wall thickness of the metal pipe is preferably not less than 1 mm and not greater than 10 mm. Metal pipes of a wall thickness less than 1 mm may be damaged while being transported or an FRP pipe is being inserted into the metal pipe. Moreover, it would be made difficult to design the inner diameter and the wall thickness of the metal pipe to satisfy only the static torsional strength required of a power transmission shaft for use in vehicles. Such design would cause the pipe to increase in diameter even when the pipe has been designed successfully. Metal pipes of a wall thickness greater than 10 mm would be too heavy to be used as a shaft of a car and thus cannot achieve the object of reducing the weight of the shaft. The outer diameter of the metal pipe should be preferably not less than 10 mm and not greater than 250 mm, desirably not less than 15 mm and not greater than 230 mm, and more desirably not less than 20 mm and not greater than 200 mm. Metal pipes of an outer diameter less than 10 mm, when used in a car, could not satisfactorily transmit torque even if an FRP pipe is inserted into the metal pipe. On the other hand, metal pipes of an outer diameter greater than 250 mm would present such a space problem as to interfere with other parts in the vehicle.

Furthermore, $t_2/t_1$ is preferably not less than 0.01 and not greater than 10, where $t_1$, is the wall thickness of the metal pipe (see FIG. 1A) and $t_2$ is the wall thickness of the FRP pipe (see FIG. 1B). With the value of $t_2/t_1$, being less than 0.01, it is difficult to achieve the flexural rigidity to satisfy the natural bending frequency required even if the shaft is incorporated with an FRP pipe having a large specific modulus of elasticity. With the value of $t_2/t_1$ being greater than 10, improvement in flexural rigidity by the incorporation of the FRP pipe can be expected. However, in this case, such a problem would be raised that this results in an increase in manufacturing cost due to a relative increase in quantity of FRP to be used.

As a matter of course, power transmission shafts obtained in this manner have reliable torsional strength and joint strength enough for use in vehicles, light in weight and compact in size. Moreover, since the outer circumference portion has a metal surface, balancing and painting can be carried out in the present lines or processes. Furthermore, at the time of actual running of the vehicles, the shaft has also the same picking-resistant property (chipping-resistant property) and salt-water corrosion-resistance as those of the current propeller shaft. In particular, forming the FRP pipe by drawing enables manufacturing power transmission shafts at lower cost when compared with the sheet wrapping method. This is because the process for winding pre-impregnation sheets, shrink tapes, the process for winding shrink tapes, and the pre-impregnation curing process (heat treatment) can be eliminated.

DETAILED DESCRIPTION OF THE PREFERRED EMBODIMENTS

Some preferred embodiments will be explained below to illustrate the present invention which is applied to propeller shafts of vehicles, as typical examples of power transmission shafts, however, it is to be understood that the present invention is not intended to be limited to these specific examples. The hammering method was applied to all embodiments to estimate the flexural rigidity of the shafts. Then, it was determined whether the resulting measured values of the natural bending frequency were equal to or greater than 130 Hz (which is equivalent to the critical number of revolutions of 7800 rpm) when the shafts were bent with the both ends thereof being supported.

EXAMPLE 1

Figure 6:
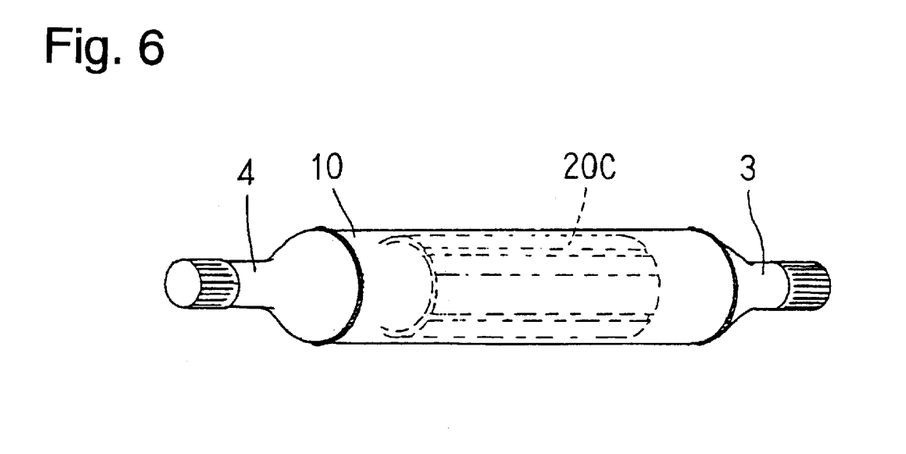
FIG. 6 is a perspective view showing the metal pipe of FIG. 5C to the both ends of which stub shafts are welded.
Figure 7A:
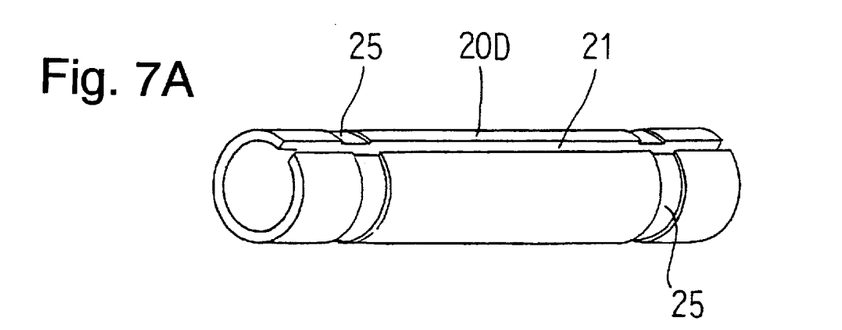
FIG. 7A is a perspective view showing an FRP pipe provided with a slit and grooves on the circumference thereof.
Figure 7B:
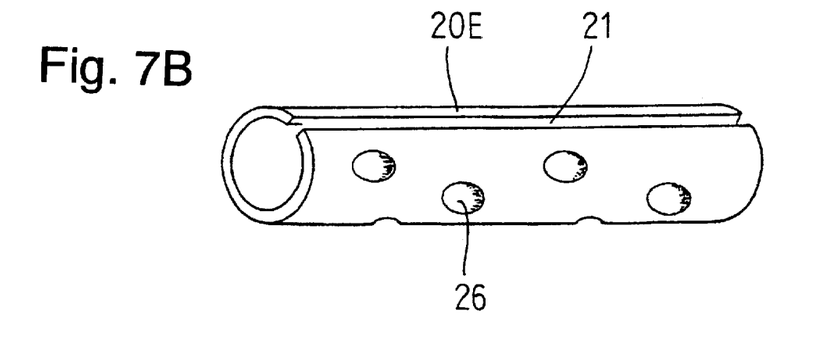
FIG. 7B is a perspective view showing an FRP pipe with a slit and recessed portions.
Figure 8A:
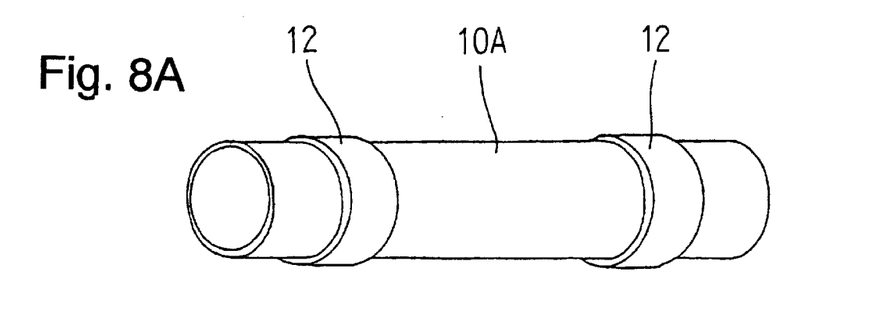
FIG. 8A is a perspective view showing a metal pipe the both sides of which have been expanded.
Figure 8B:
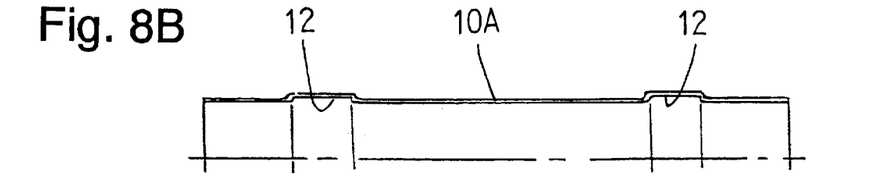
FIG. 8B is a longitudinal sectional view of the metal pipe of FIG. 8A.
Figure 8C:
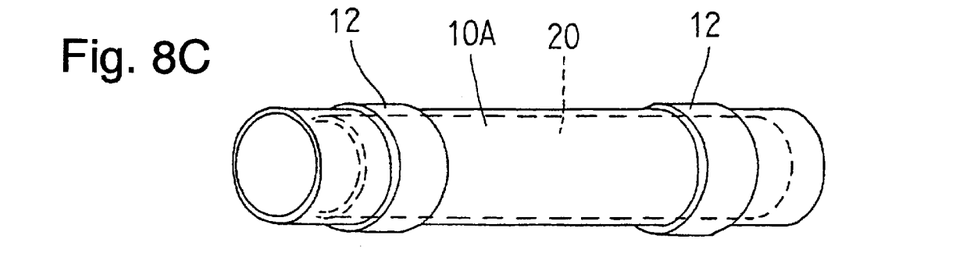
FIG. 8C is a perspective view showing a metal pipe in which an FRP pipe has been inserted.
Figure 8D:
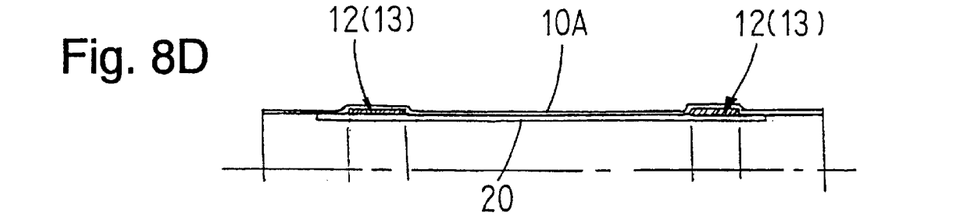
FIG. 8D is a longitudinal sectional view of FIG. 8C.

First, prepared was an iron pipe 10 (made of STKM13B, 80 mm in outer diameter, 1.6 mm in wall thickness, and 1.2 m in length) as shown in FIG. 1A. Also prepared was an FRP pipe 20A with a slit (80 mm in outer diameter, 2.3 mm in wall thickness, and 1 m in length, and 4 mm in width of the slit) as shown in FIG. 3A. Here, an adhesive (Penguin Cement #1081L, a trademark of Sunstar R&D Inc.) was applied to the inside of the iron pipe 10. Drawing was employed to form an FRP pipe 20. During the drawing, the FRP pipe 20 was impregnated with PAN-based carbon fiber CF tows (Pyrofil TRH50—a trademark of Mitsubishi Rayon Co., Ltd.) with a modulus of elasticity of $30 \times 1000$ kgf/mm$^2$ (294 GPa) and epoxy-based hardening resin used as reinforcing fiber (40 parts of Epikote 1001—a trademark of Yuka-Shell Epoxy Co., Ltd., 32 parts of Epikote 828—a trademark of Yuka-Shell Epoxy Co., Ltd., 14 parts of Sumi-epoxy ELM 120—a trademark of SUMITOMO CHEMICAL CO., LTD., and 14 parts of 4,4-diaminodiphenylsulfone). Then, as shown in FIG. 3E, the FRP pipe 20A with a slit was deformed elastically along the circumference thereof and was then inserted into the iron pipe 10 up to the middle portion thereof (refer to FIG. 3C). Thereafter, as shown in FIG. 6, stub shafts 3, 4 were welded to the both ends of the iron pipe 10. Then, the iron pipe 10 was subjected to bake-painting (at 180° C. for 1 hour) to be formed into an intermediate shaft for propeller shafts. In this case, the FRP pipe 20A is fixedly adhered to inside the iron pipe 10 due to the heat treatment of the bake painting.

The resulting intermediate shaft was supported at the both ends thereof. Then, the hammer method was applied to the measurement of the natural bending frequency of the shaft, which was found to be 175 Hz (equivalent to the critical number of revolutions of 10500 rpm). Thus, the shaft was found sufficiently practicable as an intermediate shaft for propeller shafts.

In the following examples 2–4 and comparative example, the type of iron pipes, fibers, and impregnated resins (matrix resins) used were the same as those of embodiment 1.

EXAMPLE 2

An iron pipe 10A was provided, at the both ends thereof, with expanded diameter portions 12 by plastic working as shown in FIG. 8. An FRP pipe 20A was made by drawing and provided with a slit as shown in FIG. 3A (80 mm in outer diameter, 2.3 mm in wall thickness, 1 m in length, and 4 mm in width of the slit). The FRP pipe 20A was deformed elastically along the circumference thereof and then inserted into up to the middle portion of the iron pipe 10A (refer to FIG. 8C). Thereafter, as shown in FIG. 6, the stub shafts 3, 4 were welded to the both ends of the iron pipe 10A and then subjected to the bake painting (at 180° C. for one hour) to form an intermediate shaft for propeller shafts. Like the foregoing, the FRP pipe 20A is fixedly adhered to inside the iron pipe 10A due to the heat treatment during the bake painting. The resulting intermediate shaft was supported at the both ends thereof. Then, the hammering method was applied to the measurement of the natural bending frequency of the shaft, which was found to be 175 Hz (equivalent to the critical number of revolutions of 10500 rpm). Thus, the shaft was found sufficiently practicable as an intermediate shaft for propeller shafts.

EXAMPLE 3

The FRP pipe 20A was made by drawing and provided with a slit as shown in FIG. 3A (80 mm in outer diameter, 2.3 mm in wall thickness, 1 m in length, and 4 mm in width of the slit). The FRP pipe 20A was deformed elastically along the circumference thereof and then inserted into up to the middle portion of the iron pipe 10 as shown in FIG. 1A (refer to FIG. 3C). Thereafter, the both ends of the metal pipe 10 was drawn to mechanically fix the FRP pipe 20A inserted therein (refer to FIG. 2C). Then, as shown in FIG. 6, the stub shafts 3, 4 were welded to the both ends of the metal pipe 10 and then subjected to the bake painting (at 180° C. for one hour) to form an intermediate shaft for propeller shafts. The resulting intermediate shaft was supported at the both ends thereof. Then, the hammer method was applied to the measurement of the natural bending frequency of the shaft, which was found to be 175 Hz (equivalent to the critical number of revolutions of 10500 rpm). Thus, the shaft was found sufficiently practicable as an intermediate shaft for propeller shafts.

EXAMPLE 4

The cylindrical FRP pipe 20 was made by drawing as shown in FIG. 1B (80 mm in outer diameter, 2.3 mm in wall thickness, and 1 m in length). Then, the FRP pipe 20 was press-fitted into up to the middle portion of the iron pipe 10 shown in FIG. 1A (80 mm in outer diameter, 1.6 mm in wall thickness, and 1.2 m in length) (refer to FIG. 2B). Thereafter, the both ends of the metal pipe 10 was drawn to mechanically fix the FRP pipe 20 inserted therein (refer to FIG. 2C). Then, as shown in FIG. 6, the stub shafts 3, 4 were welded to the both ends of the metal pipe 10 and then subjected to the bake painting (at 180° C. for one hour) to form an intermediate shaft for propeller shafts. The resulting intermediate shaft was supported at the both ends thereof. Then, the hammer method was applied to the measurement of the natural bending frequency of the shaft, which was found to be 175 Hz (equivalent to the critical number of revolutions of 10500 rpm). Thus, the shaft was found sufficiently practicable as an intermediate shaft for propeller shafts.

COMPARITIVE EXAMPLE

Stab shafts were welded to the both ends of the iron pipe 10 shown in FIG. 1A (80 mm in outer diameter, 1.6 mm in wall thickness, and 1.2 m in length). Then, the iron pipe 10 was subjected to the bake painting (at 180° C. for one hour) to form an intermediate shaft for propeller shafts. The resulting intermediate shaft was supported at the both ends thereof. Then, the hammer method was applied to the measurement of the natural bending frequency of the shaft, which was found to be 120 Hz (equivalent to the critical number of revolutions of 7200 rpm). The shaft was found insufficient in flexural rigidity for use as an intermediate shaft for propeller shafts.

As evident from the foregoing explanations, the power transmission shaft according to the present invention can employ welding, which is sturdy and provides high in-service reliability for a long time, for the joints between the composite FRP shaft and the metal joint elements. This allows the shaft to be used in vehicles provided with constant velocity joints. The shaft can also find preferable applications for power transmission shafts not only in vehicles but also in ships, various industrial machines, and aircraft.

The power transmission shaft according to the present invention provides high reliability of joint strength for vehicles, being light in weight and compact in size as a matter of course. In addition, the shaft of the present invention has a metal surface on the outer circumference portion thereof, thereby allowing balance correction and painting thereof to be carried out in the existing lines or processes. Furthermore, at the time of actual running of the vehicles, the shaft of the present invention has also the same picking-resistant property (chipping-resistant property) and salt-water corrosion-resistance as those of the current propeller shaft.

In particular, forming the FRP pipe by drawing enables manufacturing power transmission shafts at lower cost when compared with the sheet wrapping method. This is because the process for winding pre-impregnation sheets, shrink tapes, the process for winding shrink tapes, and the pre-impregnation curing process (heat treatment) can be eliminated.

What is claimed is:

1. A power transmission shaft comprising metal joint elements and a metal pipe connected to each other,
   wherein a fiber reinforced plastic pipe is inserted into the metal pipe,
   wherein the fiber reinforced plastic pipe is provided with a slit of not less than 0.01% and not greater than 40% of an outer circumference thereof in width in a natural state, and
   wherein said slit has a bias angle within +/−30 degrees with respect to an axial direction of the fiber reinforced plastic pipe.

2. The power transmission shaft according to claim 1, wherein D1/D2 is greater than 1 and not greater than 1.3, where D1 is an outer diameter of the fiber reinforced plastic pipe and D2 is an inner diameter of the metal pipe.

3. A power transmission shaft comprising metal joint elements and a metal pipe connected to each other, wherein a fiber reinforced plastic pipe is inserted into the metal pipe, wherein the fiber reinforced plastic pipe has a layered configuration of not more than 20 layers.

4. The power transmission shaft according to claim 3, wherein the fiber reinforced plastic pipe is provided with a slit not less than 0.01% and not greater than 40% of an outer circumference thereof in width in a natural state.

5. The power transmission shaft according to claim 3, wherein the fiber reinforced plastic pipe, formed by pultrusion to be thin-walled and large in diameter, is press-fitted into the metal pipe.

6. A power transmission shaft, comprising metal joint elements and a metal pipe connected to each other, wherein a fiber reinforced plastic pipe is inserted into the metal pipe, wherein the fiber reinforced plastic pipe is incorporated into the metal pipe and thereafter an outer circumference portion of the metal pipe is contracted in diameter by plastic deformation to allow the fiber reinforced plastic pipe and the metal pipe to be fixed to each other.

7. The power transmission shaft according to claim 3, wherein the fiber reinforced plastic pipe and the metal pipe are fixed to each other by means of adhesive.

8. A power transmission shaft comprising metal joint elements and a metal pipe connected to each other, wherein a fiber reinforced plastic pipe is inserted into the metal pipe, wherein the fiber reinforced plastic pipe and the metal pipe are fixed to each other by an adhesive, and wherein the fiber reinforced plastic pipe is provided, on outer circumference portions thereof, with portions for forming adhesive pools in between the metal pipe and the fiber reinforced plastic pipe after the fiber reinforced plastic pipe has been incorporated into the metal pipe.

9. A power transmission shaft comprising metal joint elements and a metal pipe connected to each other, wherein a fiber reinforced plastic pipe is inserted into the metal pipe, wherein the fiber reinforced plastic pipe and the metal pipe are fixed to each other by an adhesive, wherein portions for forming adhesive pools are provided in advance on inner circumference portions of the metal pipe.

10. A power transmission shaft comprising metal joint elements and a metal pipe connected to each other, wherein a fiber reinforced plastic pipe is inserted into the metal pipe, wherein $t_2/t_1$ is not less than 0.01 and not greater than 10, where $t_1$ is a wall thickness of the metal pipe and $t_2$ is a wall thickness of the fiber reinforced plastic pipe.

11. The power transmission shaft according to claim 10, wherein FL/PL is not less than 0.1 and not greater than 1.0, where PL is a length of the metal pipe and FL is a length of the fiber reinforced plastic pipe.

12. A power transmission shaft comprising metal joint elements and a metal pipe connected to each other, wherein a fiber reinforced plastic pipe is inserted into the metal pipe, wherein a modulus of tensile elasticity of reinforcing fibers used in the fiber reinforced plastic pipe is not less than 20000 $kfg/mm^2$.

13. The power transmission shaft according to claim 12, wherein the reinforcing fibers used in the fiber reinforced plastic pipe are PAN-based carbon fibers not less than 1 $\mu$m and not greater than 20 $\mu$m in diameter.

14. The power transmission shaft according to claim 3, wherein the reinforcing fibers used in the fiber reinforced plastic pipe are mesophase pitch-based carbon fibers.

15. The power transmission shaft according to claim 1, wherein the fiber reinforced plastic pipe, formed by drawing to be thin-walled and large diameter is press-fitted into the metal pipe.

16. The power transmission shaft according to claim 8, wherein the fiber reinforced plastic pipe, formed by drawing to be thin-walled and large diameter is press-fitted into the metal pipe.

17. The power transmission shaft according to claim 9, wherein the fiber reinforced plastic pipe, formed by drawing to be thin-walled and large diameter is press-fitted into the metal pipe.

* * * * *